United States Patent Office 3,823,109
Patented July 9, 1974

3,823,109
POLYMER COMPOSITIONS
Terence C. Middlebrook, Bartlesville, Okla., assignor to
Phillips Petroleum Company
No Drawing. Filed Nov. 3, 1972, Ser. No. 303,421
Int. Cl. C08c 9/14, 11/72
U.S. Cl. 260—23.7 R        4 Claims

ABSTRACT OF THE DISCLOSURE

Silico aluminate fillers are effective to reduce blooming of block polymer compositions containing fatty acids.

This invention relates to chemical compositions. More particularly, the invention relates to linear and radial teleblock compositions characterized by a reduced tendency to bloom.

Among the more widely used materials as fillers and processing aids for natural and synthetic elastomers and resinous compositions are clays of various types and fatty acids such as stearic acid. These materials are generally quite effective for their intended purpose. However, when clay is used as the filler material in combination with a fatty acid processing aid in the compounding of normally solid linear and radial teleblock copolymer compositions, particularly such compositions as do not contain an extender oil, an undesirable exudation of the fatty acids to the surface of the composition occurs. Such behavior is commonly called surface blooming in the rubber compounding art. Such blooming can, as described in the art, involve a variety of the compounding ingredients, e.g., sulfur. However, in this instance the blooming involves the fatty acid compounding ingredient. Said blooming of the fatty acid is undesirable because it can detract from the appearance of the finished article. It can also give an undesirable "feel" to the article when handled. Such blooming also causes the surface to be slippery which is often not desired and can render the article useles in some instances, such as in shoe soles or heels. If the surface of the article is to be involved in a cementing step to another surface, the blooming of the fatty acid can hinder or even prevent obtainment of a satisfactory adhesive bond in the cementing step.

It is an object of the invention to provide linear and radial teleblock copolymer compositions having a reduced tendency to bloom.

It is still another object of this invention to provide a method for at least reducing fatty acid bloom of linear and radial teleblock copolymer compositions.

These and other objects, advantages and aspects of the invention will be apparent from a reading of the disclosure and the appended claims.

The present invention provides polymeric compositions having a reduced tendency to bloom. Broadly, in accordance with the present invention, it has been discovered that the use of certain siliceous compounds in linear and radial teleblock compolymer compositions containing as a processing aid at least one fatty acid is effective in reducing blooming caused by exudation of the fatty acid compounds. The present invention further provides a method for reducing blooming comprising admixing in the substantial absence of clay at least one polymeric material selected from the group consisting of linear and radial teleblock copolymers, at least one processing aid, and at least one processing aid, and at least one siliceous material.

The linear and radial teleblock copolymers which are suitable for use in the practice of this invention comprise normally solid teleblock copolymers which are characterized by high tensile strength and elongation in an uncured, i.e., nonvulcanized, condition. Such polymers include the thermoplastic elastomers which have recently become available. These polymers are thermoplastic and, since they display high strength without vulcanization, can be formed into desired shapes by compression molding, injection molding, extrusion, or other like processes. In general, the linear and radial teleblock copolymers which can be used in the practice of the invention are characterized by having at least two terminal blocks or segments of the polymer molecule which are resinous or nonelastomeric in nature and at least one central block which is rubbery or elastomeric in nature. These thermoplastic elastomers in an uncured state exhibit at or near room temperature an elastomeric behavior typical of vulcanized rubbers while yet being thermoplastic at higher temperatures, such as normally used in molding or other forming processes for conventional thermoplastic resins.

More particularly, the linear and radial teleblock copolymers of the present invention comprise at least one copolymer of at least two dissimilar monomers selected from the group consisting of conjugated dienes having from 4 to 12 carbon atoms; vinyl-substituted mono- and polynuclear aromatic compounds having from 8 to 18 carbon atoms; lactones characterized by the formula:

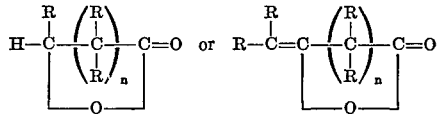

wherein each R is individually selected from the group consisting of hydrogen, and saturated aliphatic, saturated cycloaliphatic or aromatic hydrocarbon radicals having from 1 to 12 carbon atoms; the total number of carbon atoms in said R groups being not more than 12; and $n$ is an integer selected from the group consisting of 1, 3 and 4; and lactams characterized by the formula:

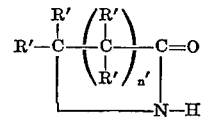

wherein R' is selected from the group consisting of hydrogen, alkyl, cycloalkyl, and aryl radicals or combinations thereof having from 1 to 10 carbon atoms, and wherein the total number of carbon atoms in such R' groups is not greater than about 12 and $n'$ is an integer having a value of 1, 2, 4, 5 or 6. Presently preferred of such linear and radial teleblock copolymers are the copolymers of conjugated dienes with vinyl-substituted aromatic compounds, with butadiene-styrene copolymers being especially preferred.

Yet more specifically, such linear and radial teleblock copolymers include copolymers of conjugated dienes with one or more monomers selected from the group consisting of vinyl-substituted aromatic compounds, lactones or lactams, including mixtures thereof; said conjugated dienes, vinyl-substituted aromatic compounds, lactones and lactams being as previously described.

The block copolymers selected from the group consisting of linear teleblock copolymers and branched or radial teleblock copolymers wherein the polymers have at least two resinous terminal polymer blocks and an elastomeric central block and are characterized by having a high tensile strength and elongation in an uncured state can be further defined by the process of their manufacture.

Thus, for example, radial teleblock copolymers as defined herein can be prepared by the sequential polymerization of at least two dissimilar monomers selected from the monomer groups consisting of vinyl-substituted aromatic compounds and conjugated dienes in the order stated and in the presence of an organomonolithium initiator and reacting the resulting lithium-terminated polymer with a polyfunctional compound having at least three reactive sites capable of reacting with the carbon-lithium bond of the polymer, thereby coupling said polymer with said polyfunctional compound. The result is a polymer having relatively long branches which radiate from a nucleus formed by the polyfunctional compound which reacts with the lithium-terminated polymer. Presently preferred as the dissimilar monomers are butadiene and styrene. Thus, an exemplary radial teleblock copolymer is a teleblock copolymer of at least one conjugated diene with at least one vinyl-substituted aromatic compound. Such a teleblock copolymer can be defined as a block copolymer having terminal resinous segments of a polymerized vinyl-substituted aromatic compound and an internal rubbery segment of a polymerized conjugated diene.

More particularly, the preferred radial teleblock copolymers employed in the invention can be prepared by a process comprising polymerizing styrene in the presence of a catalytically effective amount of at least one lithium-containing polymerization initiator selected from the group consisting of compounds having the formula $R''(Li)_x$, wherein $R''$ is a hydrocarbon radical selected from the group consisting of aliphatic, cycloaliphatic and aromatic radicals having from 1 to 20 carbon atoms, and $x$ is an integer having a value of 1 to 4, inclusive; and, without deactivating the catalyst, polymerizing 1,3-butadiene in the presence of the thus-formed polymer of styrene and said initiator to produce a polymer having an active lithium on one end of the polymer chain. This lithium-terminated polymer, also known as "polymer lithium," is then reacted with a polyfunctional compound which has at least three sites capable of reacting with the carbon-lithium bond, thereby coupling said polymer with said polyfunctional compound. The result is a polymer having relatively long branches which radiate from a nucleus formed by the polyfunctional compound which reacts with the lithium-terminated polymer. For a more detailed description of a representative method for preparing radial block copolymers, including reactants, polyfunctional compounds, reaction conditions and the like, see U.S. Pat. 3,281,383.

Linear teleblock copolymers as defined herein can be prepared by the sequential polymerization of at least two dissimilar monomers selected from the monomer groups consisting of conjugated dienes, vinyl-substituted aromatic compounds, lactones and lactams in the presence of organomonolithium or organodilithium polymerization initiators. More particularly, such linear teleblock copolymers can be prepared by polymerizing in the presence of an organomonolithium initiator at least one resin-forming monomer, e.g., styrene, from the aforementioned monomer groups; reacting with the thus-formed polymer at least one elastomer-forming monomer selected from the aforementioned monomer groups, e.g., butadiene; and, after essentially complete polymerization of the elastomer-forming monomer, adding to the polymerization mixture at least one resin-forming monomer selected from the aforementioned monomer groups, which can be the same or different from the resin-forming monomer(s) employed in the initial polymerization step. Alternatively, such linear teleblock copolymers can be prepared by polymerizing at least one elastomer-forming monomer in the presence of an organodilithium initiator and reacting with the thus-formed polymer one or more resin-forming monomers.

Exemplary of linear teleblock copolymers is a copolymer prepared by polymerizing at least one vinyl-substituted aromatic monomer as previously described in the presence of an organomonolithium initiator to form a polymer block $R'''Li$, wherein $R'''$ is a polymer of said aromatic compound(s), reacting with said polymer block at least one monomer selected from the group consisting of conjugated dienes as previously described, and, after essentially complete polymerization of the diene(s), adding to the polymerization mixture at least one monomer selected from the group consisting of the aforementioned aromatic compounds (which can be the same or different monomer or monomers as employed in the initial polymerization step), lactones, or lactams. Generally, in forming the lactone or lactam teleblock copolymers, the lactone or lactam component is the final component added to the polymerization reaction mixture. For example, a block copolymer having a first block of a homopolymer of styrene, a second block of a homopolymer of butadiene and a third block of a polyester of polymerized epsilon-caprolactone can be prepared in a three-step method using butyllithium as an initiator.

Block vinyl-substituted aromatic compound/conjugated diene/lactam terpolymers which are employed in the practice of the present invention can be prepared by a process involving polymer lithium wherein modification of polymer lithium with the reaction product of p-chlorophenyl isocyanate and the sodium salt of caprolactam is utilized prior to lactam polymerization.

The siliceous materials which are employed in the compositions of this invention can be termed mineral fillers and are selected from the group consisting of silica, hydrated silicas, alkaline earth metal silicates, and alkali metal aluminum silicates, the latter also being described as alkali metal silico aluminates. Such fillers are known in the art of rubber compounds, and examples of each type may be found in publications such as "Materials and Compounding Ingredients for Rubber," 1968 Edition, *Rubber World*, New York, N.Y.

The amount of the filler compounds employed in the compositions of this invention are broadly from 20 to about 200 parts by weight per 100 parts by weight of teleblock copolymer.

Preferably, the amount of filler is in the range of about 40 to about 120 parts by weight per 100 parts by weight of teleblock copolymer (phr.).

The practice of the present invention is particularly applicable to reducing bloom of the teleblock copolymers described herein from the use of fatty acids having from about 12 to about 24 carbon atoms per molecule, in particular stearic acid, as processing aids, antistick additives or lubricants. The amount of fatty acid which is employed in the compositions of this invention is generally in the range of from about 1 to about 10 parts by weight per 100 parts by weight of copolymer, and is preferably in the range of about 2 to about 5 parts by weight per 100 parts by weight of copolymer (phr.).

Other compounding ingredients can also be present in the compositions of this invention. Pigments, processing aids, antioxidants, stabilizers, antiozonants such as are known to the rubber compounding art, can be present if desired in amounts conventionally employed in teleblock compounds. However, it is a feature of the invention that the reduced blooming compositions do not contain clay as a filler material, since it has been discovered that the presence of clay in the linear and radial teleblock copolymers described herein and which contain at least one fatty acid as a processing aid enhances, for some presently unknown reason, blooming of such compositions.

The compositions of this invention can be mixed conventionally in an internal mixer, e.g., Banbury mixer, with all of the ingredients being added initially if so desired. They can also be mixed on an open mill in a conventional manner with a polymer being first fluxed on the mill followed by the addition of the other ingredients in any desired order. The compounds thus mixed are then ready for further processing, such as molding operations, extrusion, and the like.

Compositions of the present invention find particular utility in the formation of shoe soles, shoe heels, cove base, cutting blocks, work surfaces on furniture, toys and amusement devices.

The following examples are illustrative of the practice of the invention.

EXAMPLE I

To demonstrate the concept of the present invention, a series of elastomeric compositions was obtained. In each run, the individual components were blended in a Banbury mixer and formed into test specimens. The results are reported in the accompanying Table I.

It will be noted that in Runs 10–12, 15 and 17–19, the use of stearic acid as a processing aid in a clay-filled radial block copolymer resulted in exudation of the stearic acid

TABLE I

| | Curing time, min. | Run number | | | | | | | | |
|---|---|---|---|---|---|---|---|---|---|---|
| | | 1 | 2 | 3 | 4 | 5 | 6 | 7 | 8 | 9 |
| Composition, parts by weight: | | | | | | | | | | |
| Solprene 406 | | 100 | 100 | 100 | | | | | | |
| Solprene 1204 | | | | | 100 | 100 | | | | |
| SBR 1502 | | | | | | | 100 | 100 | | |
| #1 smoked sheet | | | | | | | | | 100 | 100 |
| N-660 black | | 5 | 5 | 5 | 5 | 5 | 5 | 5 | 5 | 5 |
| Polyfil 70 clay | | 80 | 80 | | 80 | | 80 | | 80 | |
| Zeolex 23 | | | | 80 | | 80 | | 80 | | 80 |
| Cumar MH 2½ | | 10 | 40 | 40 | 40 | 40 | 40 | 40 | 40 | 40 |
| Stearic acid | | 3 | 3 | 3 | 3 | 3 | 3 | 3 | 3 | 3 |
| Zinc oxide | | | | | 3 | 3 | 3 | 3 | 3 | 3 |
| MBTS | | | | | 2 | 2 | 2 | 2 | 2 | 2 |
| DOTG | | | | | 1 | 1 | 1 | 1 | 1 | 1 |
| Sulfur | | | | | 2.5 | 2.5 | 2.5 | 2.5 | 2.5 | 2.5 |
| Blending temperature, °F | | 320 | 280 | 290 | 300 | 325 | 270 | 300 | 295 | 310 |
| loom | | Yes | Yes | No | No | No | No | No | No | No |
| Properties: | | | | | | | | | | |
| 200% modulus, p.s.i.[a] | 10 | 980 | 900 | 860 | | | | | | |
| | 20 | | | | 600 | 625 | 455 | 415 | 865 | 430 |
| | 40 | | | | 565 | 600 | 465 | 410 | 700 | 375 |
| 300% Modulus, p.s.i.[a] | 10 | 1,065 | 1,075 | 970 | | | | | | |
| | 20 | | | | 970 | 940 | 730 | 650 | 1,440 | 715 |
| | 40 | | | | 930 | 895 | 730 | 650 | 1,215 | 635 |
| Tensile, p.s.i.[a] | 10 | 1,670 | 1,720 | 1,850 | | | | | | |
| | 20 | | | | 2,185 | 2,260 | 2,565 | 2,580 | 2,665 | 1,710 |
| | 40 | | | | 1,920 | 2,240 | 2,370 | 2,700 | 2,430 | 1,630 |
| Elongation, percent [a] | 10 | 730 | 770 | 660 | | | | | | |
| | 20 | | | | 595 | 590 | 690 | 645 | 490 | 510 |
| | 40 | | | | 555 | 585 | 650 | 650 | 500 | 545 |

[a] Determined according to ASTM D 412-66.

It will be noted that in Runs 1 and 2 the use of stearic acid as a processing aid in a clay-filled block copolymer (Solprene 406) resulted in exudation of the stearic acid to the surface of the test specimen; whereas substitution of the silico aluminate fillers in accordance with the present invention in such polymeric material resulted in a composition that was non-blooming (Run 3). It will also be noted, see Runs 4–9, that the use of stearic acid as a processing aid with polymeric materials which are not teleblock copolymer compounds as defined in the present specification, are not affected as far as blooming is concerned by the presence of clays such as Polyfil 70 clay or the substitution for such clay with silico aluminate fillers such as Zeolex 23. Runs 1–3, in particular, demonstrate the operability of substituting a silico aluminate filler for clays when a fatty acid, such as stearic acid, is used as a processing aid with teleblock polymer compositions to at least inhibit blooming of the compositions.

EXAMPLE II

In the following example, a series of elastomeric compositions was obtained by blending the individual components in a Banbury mixer and forming the mixtures into test specimens. The results are reported in the accompanying Table II.

to the surface of the test specimen; whereas substitution of the silico aluminate fillers in accordance with the present invention in such polymeric material resulted in compositions that were nonblooming, Runs 13, 14 and 16. The example demonstrates the operability of siliceous fillers in inhibiting blooming in polymeric compositions containing no clay and employing fatty acids such as stearic acid as a processing aid.

The materials used in the foregoing Runs 1–19 are more completely identified as follows:

(1) Solprene[1] 406—a butadiene/styrene (60/40) block copolymer having about 35% block polystyrene, a Mooney viscosity (MS-4 at 270° F.) of about 70, an inherent viscosity of about 1.15 and made according to the procedures described in U.S. Pat. 3,281,383.

(2) Solprene[1] 1204—a solution-polymerized random butadiene/styrene (75/25) copolymer having a Mooney viscosity (ML-4 at 212° F.) of 51–61, an inherent viscosity of about 1.90, and made according to the procedures of U.S. Pat. 3,393,182.

(3) SBR–1502—an emulsion-polymerized random butadiene/styrene copolymer (77/23) prepared as described in ASTM D1419–61T.

[1] Registered trademarks of Phillips Petroleum Company.
[1] Registered trademarks of Phillips Petroleum Company.

TABLE II

| Run Number | 10 | 11 | 12 | 13 | 14 | 15 | 16 | 17 | 18 | 19 |
|---|---|---|---|---|---|---|---|---|---|---|
| Composition, parts by weight: | | | | | | | | | | |
| Radial copolymer [a] | 100 | 100 | 100 | 100 | 100 | 100 | 100 | 100 | 100 | 100 |
| Polyfil 70 clay | 80 | 120 | 200 | | | 80 | | 80 | 80 | 80 |
| Zeolex 23 | | | | 80 | 120 | | 80 | | | |
| N-660 black | 5 | 5 | 5 | 5 | 5 | 5 | 5 | 5 | 5 | 5 |
| Asbestos | | | | | | 80 | 80 | | | |
| Cumar MH 2½ | 40 | 40 | 40 | 40 | 40 | 40 | 40 | 60 | 20 | 20 |
| Styron 678 | | | | | | | | | 40 | 20 |
| Marlex 4270 | | | | | | | | | | 20 |
| Stearic acid | 3 | 3 | 3 | 3 | 3 | 3 | 3 | 3 | 3 | 3 |
| Bloom | Yes | Yes | Yes | No | No | Yes | No | Yes | Yes | Yes |

Specimens compression molded at 280° F. for 10 minutes

| Properties: | | | | | | | | | | |
|---|---|---|---|---|---|---|---|---|---|---|
| 200% Modulus, p.s.i. | 930 | 1,140 | | 1,020 | 1,410 | 1,170 | 1,260 | 980 | 1,590 | 1,370 |
| 300% Modulus, p.s.i. | 1,105 | 1,270 | | 1,300 | 1,560 | 1,200 | | 1,165 | 1,625 | 1,460 |
| Tensile, p.s.i. | 1,500 | 1,490 | 1,350 | 1,950 | 1,630 | 1,210 | 1,300 | 1,330 | 1,660 | 1,560 |
| Elongation, percent | 630 | 570 | 320 | 650 | 460 | 370 | 290 | 570 | 430 | 490 |

[a] A radial teleblock copolymer of butadiene/styrene (60/40) having about 35% block polystyrene and a Mooney viscosity of 33 (MS-4 at 270° F.).

(4) #1 Smoked Sheet—natural rubber of the indicated grade.
(5) Polyfil 70 Clay—aluminum silicate (Georgia kaolin) of 2.68 specific gravity and 50% finer than 2 microns.
(6) Zeolex 23—precipitated hydrated sodium silico aluminate.
(7) Cumar MH 2½—polymers of indene, coumarone and associated coal tar compounds having a melting point of 115–125° C.
(8) MBTS—mercaptobenzothiazyl disulfide.
(9) DOTG—di-ortho-tolylguanidine.
(10) N 660—carbon black of type N 660 according to ASTM D2516–66T.
(11) Styron 678—polystyrene, crystal grade resin.
(12) Marlex¹ 4270—polyethylene of 0.942 g./cc. density (ASTM D1505–63T) and 7.0 g./10 min. melt index (ASTM D1238–62T).

Reasonable variations and modifications are possible within the scope of this disclosure without departing from the spirit and scope thereof.

¹ Registered trademarks of Phillips Petroleum Company.

I claim:

1. A thermoplastic polymeric composition having a reduced tendency to bloom consisting essentially of at least one polymeric material selected from the group consisting of linear teleblock copolymers and radial teleblock copolymers wherein said teleblock copolymers are characterized by having at least one central block of the polymer molecule formed of at least one conjugated diene having from 4 to 12 carbon atoms and at least two terminal blocks of the polymer molecule formed of at least one monomer selected from the group consisting of vinyl-substituted mono- and polynuclear aromatic compounds having from 8 to 18 carbon atoms; lactones characterized by the formula:

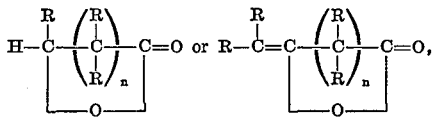

wherein each R is individualy selected from the group consisting of hydrogen and saturated aliphatic, saturated cycloaliphatic and aromatic radicals having from 1 to 12 carbon atoms, the total number of carbon atoms in said R groups being not more than 12, and n is an integer having a value of 1, 3 or 4; and lactams characterized by the formula:

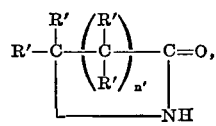

wherein R' is selected from the group consisting of hydrogen, alkyl, cycloalkyl, and aryl radicals or combinations thereof having from 1 to 12 carbon atoms, the total number of carbon atoms in such R' groups being not more than 12, and n' is an integer having a value of 1, 2, 4, 5 or 6;

from about 1 to about 10 parts by weight per 100 parts by weight of polymeric material of at least one fatty acid having from 12 to 24 carbon atoms per molecule; and from about 20 to about 200 parts by weight per 100 parts by weight of polymeric material of at least one siliceous material selected from the group consisting of silica, hydrated silica, alkaline earth metal silicates and alkali metal aluminum silicates.

2. A composition according to claim 1 wherein said teleblock copolymers are selected from the group consisting of copolymers of at least one conjugated diene having from 4 to 12 carbon atoms with at least one vinyl-substituted aromatic compound having from 8 to 18 carbon atoms.

3. A composition according to claim 2 wherein said conjugated diene is 1,3-butadiene and said vinyl-substituted aromatic compound is styrene.

4. A composition according to claim 3 wherein said siliceous material is precipitated hydrated sodium silico aluminate.

References Cited

UNITED STATES PATENTS

| | | | |
|---|---|---|---|
| 3,519,595 | 7/1970 | Miller | 260—45.8 N |
| 3,281,383 | 10/1966 | Zelinski | 260—23.7 R |
| 3,393,182 | 7/1968 | Trepka | 260—84.3 |
| 3,557,252 | 1/1971 | Hsieh | 260—876 |
| 3,557,255 | 1/1971 | Sharkey | 260—879 |

OTHER REFERENCES

"Rubber Age," Railsback, 1964, pp. 583–589.

HOSEA E. TAYLOR, Primary Examiner
W. E. PARKER, Assistant Examiner

U.S. Cl. X.R.

260—45.8 N, 79.5 R, 876 R, 879 R, 880 B